United States Patent [19]

Nienburg et al.

[11] Patent Number: 5,021,376
[45] Date of Patent: Jun. 4, 1991

[54] METHOD FOR PREPARING A CERAMIC SUSPENSION

[75] Inventors: Hans Nienburg; Friedrich Harbach, both of Heidelberg; Peter Stein, Mannheim, all of Fed. Rep. of Germany

[73] Assignee: Asea Brown Boveri Aktiengesellschaft, Mannheim, Fed. Rep. of Germany

[21] Appl. No.: 300,112

[22] Filed: Jan. 19, 1989

[30] Foreign Application Priority Data

Jan. 19, 1988 [DE] Fed. Rep. of Germany ....... 3801326

[51] Int. Cl.$^5$ ............................................. C04B 35/10
[52] U.S. Cl. ..................................... 501/153; 501/127; 264/86; 264/23
[58] Field of Search ............... 501/147, 148, 127, 153; 264/256, 86, 23

[56] References Cited

U.S. PATENT DOCUMENTS

| | | | |
|---|---|---|---|
| 3,819,785 | 6/1974 | Argyle et al. | 264/86 |
| 4,017,324 | 4/1977 | Eggers | 501/148 |
| 4,183,830 | 1/1980 | Chester . | |
| 4,517,098 | 5/1985 | Hann et al. | 501/148 |
| 4,587,068 | 5/1986 | Borase et al. . | |
| 4,738,726 | 4/1988 | Pratt et al. | 501/148 |
| 4,814,302 | 3/1989 | Matje et al. | 264/86 |
| 4,882,304 | 11/1989 | Novich et al. | 264/86 |

FOREIGN PATENT DOCUMENTS 0190668 8/1986 European Pat. Off. .

OTHER PUBLICATIONS

"Efficient use of Whiskers in the Reinforcement of Ceramics" Milewski *Advanced Cer. Mat'ls* , pp. 36–40 (1986).
*Ceramic Processing* Mat'ls Advisory Board, pp. 23–29 (1969).
U.S. Publication:Chemical Abstracts, vol. 92, 1980, p. 304, ref. 81190m.
U.S. Publication:Ceramic Bulletin, 1972, pp. 216 and 217.

*Primary Examiner*—William R. Dixon, Jr.
*Assistant Examiner*—Paul Marcantoni
*Attorney, Agent, or Firm*—Herbert L. Lerner; Laurence A. Greenberg

[57] ABSTRACT

A method for preparing a ceramic suspension using alpha-$Al_2O_3$ powder containing agglomerated powder particles includes dissolving ionic or polymeric reagents as additional dispersing agents in water or an organic solvent as a dispersion medium. Alpha-$Al_2O_3$ powder is added thereto while being stirred. Ceramic molded articles may be produced from the suspension.

21 Claims, No Drawings

METHOD FOR PREPARING A CERAMIC SUSPENSION

The invention relates to a method for preparing a ceramic suspension using alpha-$Al_2O_3$ powder containing agglomerated powder particles, and a method of producing articles from the suspension.

When producing molded articles of ceramic, the starting material is ceramic powder Various different shaping methods are known for producing molded articles from such ceramic powder, such as dry pressing and slip casting. In the case of dry pressing, granulated powders must be used for processing reasons, and in classic slip casting, relatively large-grain or agglomerated powders are used. These starting conditions result in major chemical and mechanical inhomogeneity in the ceramic, which can then impair the strength and other properties of the ceramic component. In order to avoid these disadvantages, wet shaping methods such as electrophoretic deposition in which a suspension of fine ceramic particles is used, are preferred in so-called high-performance ceramics. Such methods are known from German Published, Non-Prosecuted Application DE-OS 27 52 003. However, even such such methods have the problem that the powder used virtually always includes agglomerates of the powder particles primarily produced. This problem of agglomeration and the effects of the agglomerates in the processing of ceramic powder are, for instance, described in the article "Agglomerates and Agglomeration in Ceramic Processing" by J. W. Haloran, in the publication *Ultra-structure Processing of Ceramics, Glasses and Composites*, L. L. Hench and D. R. Ulrich (ed.), John Wiley & Sons, New York etc., 1984, pp. 404–417. It can also be learned from that publication that various mechanisms cause the formation of the agglomerates, and various forces make the primary powder particles cohere.

In the preparation of suspensions for producing ceramic molded articles, the goal is to attain a dispersion of the powder agglomerates in a solvent, or in other words to overcome the forces that bind them. Depending on the type of ceramic particle, various solvents are known. The article by M. V. Parish, R. R. Garcia, and H. K. Bowen, "Dispersions of Oxide Powders in Organic Liquids", J. Mat. Sci. 20, pp. 996–1008, 1985, reports the results of tests in which the suitability of 19 different organic liquids and water for dispersing 13 different metal oxides were studied. However, aluminum oxide was not among the metal oxides studied.

Molded articles made of or based on aluminum oxide are required in producing high-powered batteries for storing electrical energy, for instance.

Both solid electrolyte bodies of beta-aluminum oxide and tubular or plate-like parts of alpha-aluminum oxide are needed for this purpose.

It is accordingly an object of the invention to provide a method for preparing a ceramic suspension, which overcomes the hereinafore-mentioned disadvantages of the heretoforeknown methods of this general type and which uses alpha-aluminum oxide particles.

With the foregoing and other objects in view there is provided, in accordance with the invention, a method for preparing a ceramic suspension using alpha-$Al_2O_3$ powder containing agglomerated powder particles, which comprises dissolving ionic or polymeric reagents as additional dispersing agents in water or an organic solvent as a dispersion medium; and adding alpha-$Al_2O_3$ powder thereto while being stirred.

In accordance with another mode of the invention, there is provided a method which comprises employing water as the dispersion medium, and employing from 0.1 to 2% by weight with respect to alpha-$Al_2O_3$ of a substance from the group consisting of bases, mineral acids and carbonic acids as the dispersing agent.

In accordance with a further mode of the invention, there is provided a method which comprises employing water as the dispersion medium, and employing from 0.1 to 2% by weight with respect to alpha-$Al_2O_3$ of a substance from the group consisting of $NH_4OH$, organic amines, HCl, $HNO_3$, acetic acid and p-hydroxybenzoic acid as the dispersing agent.

In accordance with an added mode of the invention, there is provided a method which comprises employing water as the dispersion medium, and employing from 0.1 to 5% by weight with respect to alpha-$Al_2O_3$ of a substance from the group consisting of olygomeric electrolytes and polymeric electrolytes as the dispersing agents.

In accordance with an additional mode of the invention, there is provided a method which comprises employing water as the dispersion medium, and employing from 0.1 to 5% by weight with respect to alpha-$Al_2O_3$ of a substance from the group consisting of 3,6,9-trioxaundecane diacid, polyglycol diacid, napthalene sulfonic acid condensate, maleic acid copolymer, polyacrylic acid, partially esterified polyacrylic acid and the ammonium salts of these compounds as the dispersing agents.

In accordance with yet another mode of the invention, there is provided a method which comprises employing alcohols as the dispersion medium, and employing from 0.1 to 2% by weight with respect to alpha-$Al_2O_3$ of a substance from the group consisting of organic bases and carbonic acids as the dispersing agents.

In accordance with yet a further mode of the invention, there is provided a method which comprises employing a substance from the group consisting of methanol, ethanol and propanol as the dispersion medium, and employing from 0.1 to 2% by weight with respect to alpha-$Al_2O_3$ of a substance from the group consisting of triethylamine, tetrabutylammonium hydroxide, acetic acid, p-hydroxybenzoic acid and 3,6,9-trioxaundecane diacid as the dispersing agents.

In accordance with yet an added mode of the invention, there is provided a method which comprises employing alcohols as the dispersion medium, and employing from 0.1 to 5% by weight with respect to alpha-$Al_2O_3$ of polymers as the dispersing agents.

In accordance with yet an additional mode of the invention, there is provided a method which comprises employing a substance from the group consisting of methanol, ethanol and propanol as the dispersion medium, and employing from 0.1 to 5% by weight with respect to alpha-$Al_2O_3$ of a substance from the group consisting of polyvinyl pyrrolidone, nitrocellulose, polyacrylic acid, partially esterified polyacrylic acid and polyvinyl butyral as the dispersing agents.

In accordance with still another mode of the invention, there is provided a method which comprises employing from 30 to 90% by weight with respect to the total formulation of alpha-$Al_2O_3$ powder having a mean grain size under 1 μm.

In accordance with still a further mode of the invention, there is provided a method which comprises employing fractionated alpha-$Al_2O_3$ powder 80% of which has a grain size distribution range of from 0.1 to 0.6 μm.

In accordance with still an added mode of the invention, there is provided a method which comprises additionally dispersing the alpha-$Al_2O_3$ powder with ultrasound.

With the objects of the invention in view, there is also provided a method for producing ceramic molded articles, which comprises preparing a ceramic suspension using alpha-$Al_2O_3$ powder containing agglomerated powder particles by dissolving ionic or polymeric reagents as additional dispersing agents in water or an organic solvent as a dispersion medium and adding alpha-$Al_2O_3$ powder thereto while being stirred, and producing ceramic molded articles by wet shaping the ceramic suspension.

In accordance with a concomitant mode of the invention, there is provided a method which comprises shaping the ceramic suspension by electrophoretic deposition.

According to the invention, a combination of water or organic solvents as a dispersion medium and ionic or polymeric reagents as a dispersing agent, or in other words as additives to the actual solvent, are proposed. The selection of one of the embodiments of the method defined by the other modes mentioned above depends on the particular conditions which may exist due to different components of the suspension or requirements of the apparatus used for further processing the suspension. For instance, acids will be used as dispersing agents, if the binders used as additives dissolve only in acid. If the apparatus intended for shaping is vulnerable to alkaline substances, then in order to prevent corrosion, correspondingly different dispersing agents are used. Another example would be an intended electrophoretic deposition, for which a suspension with water would be unsuitable because of the decomposition of water that would occur, and therefore in that case alcohols would be preferable as solvents.

It is understood that in this context, the term "dissolving" always means dispersing rather than dissociation. The powder agglomerate used can accordingly only disperse in the solvent up to the grain size of the primary powder particles.

The proposed combinations of dispersion media and dispersing agents have the primary task of breaking up powder agglomerates and stabilizing the ceramic particles, thereby enabling processing of the suspension even after several days. Furthermore, the polymeric dispersing agents have the property of acting as binders, which increases the strength of the ceramic greenware. In order to increase the action as a binder, the proportion of a polymeric dispersing agent can be increased to approximately 5% by weight (in terms of alpha-aluminum oxide). Finally, when the prepared suspension is used for direct wet shaping, particularly fine-grained and homogenous molded articles are attainable.

Other features which are considered as characteristic for the invention are set forth in the appended claims.

Although the invention is illustrated and described herein as embodied in a method for preparing a ceramic suspension, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific examples.

EXAMPLE

Reference will now be made in detail to an exemplary embodiment of the invention. In this example, an alcohol, namely ethanol, is used as the dispersion medium. Polyacrylic acid is dissolved in the alcohol as a dispersing agent, with the quantity of polyacrylic acid being measured as approximately 1.5% by weight with respect to alpha-$Al_2O_3$. Alpha-$Al_2O_3$ powder is added portion by portion to this solution while stirring, with an average grain size of 0.5 μm in diameter. The added powder quantity amounts to approximately 60% by weight in terms of the total formulation. This formulation is then acoustically irradiated with an ultrasound pipe for approximately 15 minutes while being stirred and ice-cooled. The result is a largely agglomerate-free, low-viscosity suspension that is stable for several days. Such a suspension can advantageously be used, for instance, for shaping by electrophoretic deposition from the suspension.

The foregoing is a description corresponding in substance to German Application P 38 01 326.6, dated Jan. 19, 1988, the International priority of which is being claimed for the instant application, and which is hereby made part of this application. Any material discrepancies between the foregoing specification and the aforementioned corresponding German application are to be resolved in favor of the latter.

We claim:

1. A method for preparing a suspension of 30–90 wt. % alpha-$Al_2O_3$ in deagglomerated form from alpha-$Al_2O_3$ having a mean grain size under 1 μm which comprises the steps of forming a dispersion by dissolving 0.1 to 2% by weight, with respect to the alpha-$Al_2O_3$, of a dispersing agent in a dispersion medium, wherein the medium is selected from the group consisting of (a) water and (b) a lower alkanol of up to three carbon atoms and when the medium is (a) water, the dispersing agent is an electrolyte selected from the group consisting of ammonium hydroxide, lower organic amines, nitric acid and carboxylic acids and at least one complex water-soluble polyelectrolyte selected from the group consisting of 3,6,9-trioxaundecane diacid, polyglycol diacid, naphthalene sulfonic acid condensate, polyacrylic acid, partially esterified polyacrylic acid and the ammonium salts of the complex acids; and when the dispersion medium is the (b) alkanol the dispersing agent is selected from the group consisting of triethylamine and tetrabutyl ammonium hydroxide strong organic bases; acetic acid, p-hydroxy-benzoic acid and 3,6,9-trioxaundecane diacid carbolic acids; and polyvinyl pyrrolidone, nitrocellulose, polyacrylic acid, partially esterified polyacrylic acid and polyvinyl butyral polymers and a mixture thereof; then adding the alpha $Al_2O_3$ to the solution and agitating for a time sufficient to deagglomerate the alpha-$Al_2O_3$ to the mean grain size.

2. The method according to claim 1 wherein the agitation is continued until the deagglomeration results in a distribution of 30 to 90% by weight of the alpha-$Al_2O_3$ having a mean particle size range of 0.1 to 0.6 μm.

3. The method according to claim 1, wherein the agitation includes ultrasound agitation.

4. The method according to claim 1, wherein the medium is water and the agent is selected from the group consisting of ammonium hydroxide, lower organic amines, nitric acid and carboxylic acids from the group consisting of acetic acid and p-hydroxy-benzoic acid.

5. The method according to claim 1, wherein the medium is water and the agent is selected from the group consisting of 3,6,9-trioxaundecane diacid, polyglycol diacid, naphthalene sulfonic acid condensate, polyacrylic acid, partially esterified polyacrylic acid complex water-soluble polyelectrolytes and their ammonium salts.

6. The method according to claim 1, wherein the medium is an alkanol selected from the group consisting of methanol, ethanol and propanol and the agent is selected from the group consisting of organic bases and acids, the bases being selected from the group consisting of triethylamine, tetrabutyl ammonium hydroxide and the acid is selected from the group of carboxylic acids consisting of acetic acid, p-hydroxy-benzoic acid, and 3,6,9-trioxaundecane diacid and mixture thereof.

7. The method according to claim 1, wherein the medium is an alkanol selected from the group consisting of methanol, ethanol and propanol and the agent is selected from the group of water-soluble polymers consisting of polyvinyl pyrrolidone, nitrocellulose, polyacrylic acid and polyvinyl butyral.

8. The method according to claim 1, which comprises subsequently producing shaped ceramic articles by one of electrodeposition and slip casting with the suspension as a vehicle.

9. The method according to claim 2, which comprises subsequently producing shaped ceramic articles by one of electrodeposition and slip casting with the suspension as a vehicle.

10. The method according to claim 3, which comprises subsequently producing shaped ceramic articles by one of electrodeposition and slip casting with the suspension as a vehicle.

11. The method according to claim 4, which comprises subsequently producing shaped ceramic articles by one of electrodeposition and slip casting with the suspension as a vehicle.

12. The method according to claim 5, which comprises subsequently producing shaped ceramic articles by one of electrodeposition and slip casting with the suspension as a vehicle.

13. The method according to claim 6, which comprises subsequently producing shaped ceramic articles by one of electrodeposition and slip casting with the suspension as a vehicle.

14. The method according to claim 7, which comprises subsequently producing shaped ceramic articles by one of electrodeposition and slip casting with the suspension as a vehicle.

15. The method according to claim 1, which comprises subsequently producing shaped ceramic articles by electrodeposition with the suspension as a vehicle and the alkanol as the dispersion medium.

16. The method according to claim 2, which comprises subsequently producing shaped ceramic articles by electrodeposition with the suspension as a vehicle and the alkanol as the dispersion medium.

17. The method according to claim 3, which comprises subsequently producing shaped ceramic articles by electrodeposition with the suspension as a vehicle and the alkanol as the dispersion medium.

18. The method according to claim 4, which comprises subsequently producing shaped ceramic articles by electrodeposition with the suspension as a vehicle and the alkanol as the dispersion medium.

19. The method according to claim 5, which comprises subsequently producing shaped ceramic articles by electrodeposition with the suspension as a vehicle and the alkanol as the dispersion medium.

20. The method according to claim 6, which comprises subsequently producing shaped ceramic articles by electrodeposition with the suspension as a vehicle and the alkanol as the dispersion medium.

21. The method according to claim 7, which comprises subsequently producing shaped ceramic articles by electrodeposition with the suspension as a vehicle and the alkanol as the dispersion medium.

* * * * *